US009744421B2

(12) United States Patent
Chan

(10) Patent No.: US 9,744,421 B2
(45) Date of Patent: Aug. 29, 2017

(54) METHOD OF ANALYSING A VIDEO OF SPORTS MOTION

(75) Inventor: Shun Heng Chan, Hamilton (NZ)

(73) Assignee: SWING PROFILE LIMITED, Remuera, Auckland (NZ)

( * ) Notice: Subject to any disclaimer, the term of this patent is extended or adjusted under 35 U.S.C. 154(b) by 683 days.

(21) Appl. No.: 13/824,135

(22) PCT Filed: Jun. 27, 2012

(86) PCT No.: PCT/NZ2012/000109
§ 371 (c)(1),
(2), (4) Date: Mar. 15, 2013

(87) PCT Pub. No.: WO2013/002653
PCT Pub. Date: Jan. 3, 2013

(65) Prior Publication Data
US 2013/0178304 A1 Jul. 11, 2013

Related U.S. Application Data

(60) Provisional application No. 61/501,281, filed on Jun. 27, 2011.

(30) Foreign Application Priority Data

Oct. 25, 2011 (NZ) ........................ 595937

(51) Int. Cl.
*A63B 69/36* (2006.01)
*G06K 9/00* (2006.01)
*G06T 7/254* (2017.01)

(52) U.S. Cl.
CPC .......... *A63B 69/36* (2013.01); *G06K 9/00342* (2013.01); *G06K 9/00724* (2013.01);
(Continued)

(58) Field of Classification Search
USPC ............... 473/218, 200, 266, 269, 270, 409; 434/247, 252, 257
See application file for complete search history.

(56) References Cited

U.S. PATENT DOCUMENTS 6,537,076 B2 * 3/2003 McNitt ............. A63B 24/0003
434/247
6,567,536 B2 5/2003 McNitt et al.
(Continued)

FOREIGN PATENT DOCUMENTS

JP 2003-117045 A 4/2003
JP 2004-180076 A 6/2004
(Continued)

OTHER PUBLICATIONS

Farid, H. et al., Video Stabilization and Enhancement, Sep. 2007, TR2007-605, Department of Computer Science, Dartmouth College.
(Continued)

*Primary Examiner* — Nini Legesse
(74) *Attorney, Agent, or Firm* — Scully, Scott, Murphy & Presser, P.C.

(57) ABSTRACT

A method, apparatus, system and computer program product for analyzing video images of a sports motion is provided for identification of key motion positions within a video and automatic extraction of segments of a video containing a sports motion. Video data displaying a sports motion has data representative of a number of image frames. For a number of image frames, one or more frame difference measures are calculated between the image frame and another image frame. The frame difference measures are analyzed to identify a plurality of image frames that each show a key position of the sports motion. The segment of the video containing the sports motion showing the sports motion is between two of the image frames showing the key
(Continued)

positions. Frame difference measures may be calculated based on pixel difference measures or optical flow techniques.

22 Claims, 9 Drawing Sheets

(52) U.S. Cl.
CPC .......... *G06K 9/00751* (2013.01); *G06T 7/254* (2017.01); *G06T 2207/30221* (2013.01)

(56) References Cited

U.S. PATENT DOCUMENTS

| | | | |
|---|---|---|---|
| 7,097,459 B2 | 8/2006 | Ueda et al. | |
| 7,110,454 B1 | 9/2006 | Chakraborty | |
| 7,200,282 B2 | 4/2007 | Xu | |
| 7,283,647 B2* | 10/2007 | McNitt | A63B 24/0003 382/107 |
| 7,704,157 B2 | 4/2010 | Shirai et al. | |
| 7,857,708 B2 | 12/2010 | Ueda et al. | |
| 8,020,098 B2* | 9/2011 | Katayama | A63B 24/0003 715/720 |
| 2002/0064764 A1* | 5/2002 | Fishman | A63B 24/0003 434/252 |
| 2005/0013467 A1 | 1/2005 | McNitt | |
| 2006/0252018 A1 | 11/2006 | Sooch | |
| 2006/0281060 A1 | 12/2006 | Katayama | |
| 2009/0263023 A1 | 10/2009 | Iwamoto | |
| 2011/0122154 A1* | 5/2011 | Kawai | G11B 27/034 345/629 |
| 2011/0275045 A1* | 11/2011 | Bhupathi | G09B 19/003 434/247 |

FOREIGN PATENT DOCUMENTS

| | | |
|---|---|---|
| JP | 2005-210666 A | 8/2005 |
| KR | 101002846 B1 | 12/2010 |
| WO | 2010/085704 A1 | 7/2010 |

OTHER PUBLICATIONS

International Search Report dated Nov. 8, 2012 issued in PCT/NZ2012/000109.

Dufaux, F, "Key frame selection to represent a video", Image Processing, 2000, Proceedings. 2000 International Conference on September 10-13, 2000, IEEE, Piscataway, NJ, USA, Sep. 10, 2000 (Sep. 10, 2000), vol. 2, pp. 275-278, XP031534446.

Wang, L. et al., "Recent developments in human motion analysis", Pattern Recognition, vol. 36, No. 3, Mar. 1, 2003 (Mar. 1, 2003), pp. 585-601, XP004393092.

Brezeale, D. et al., "Automatic Video Classification: A Survey of the Literature", IEEE Transactions on Systems, Man, and Cybernetics: Part C:Applications and Reviews, IEEE Service Center, Piscataway, NJ, US, vol. 38, No. 3, May 1, 2008 (May 1, 2008), pp. 416-430, XP011345977.

Liu, T. et al."A Novel Video Key-Frame-Extraction Algorithm Based on Perceived Motion Energy Model", IEEE Transactions on Circuits and Systems for Video Technology, IEEE Service Center, Piscataway, NJ, US, vol. 13, No. 10, Oct. 1, 2003 (Oct. 1, 2003), pp. 1006-1013, XP001175085.

Ekin, A. et al., "Automatic Soccer Video Analysis and Summarization", IEEE Transactions on Image Processing, IEEE Service Center, Piscataway, NJ, US, vol. 12, No. 7, Jul. 1, 2003 (Jul. 1, 2003), XP011074413.

Supplementary European Search Report dated May 19, 2015 received in related EP 12 80 3819.

Notice of Reasons for Rejection dated Mar. 28, 2016 received in related application JP 2014-518472.

* cited by examiner

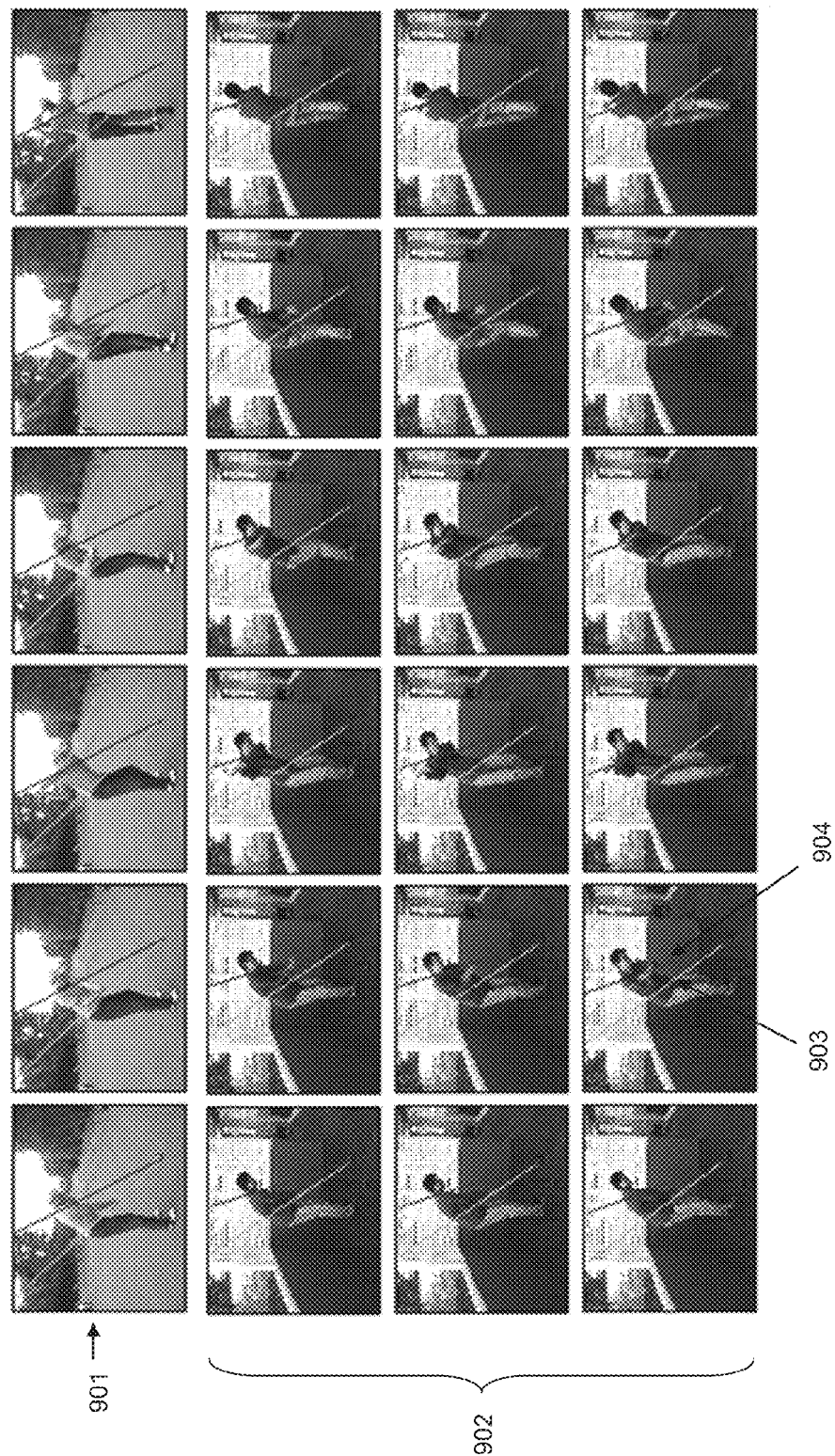

METHOD OF ANALYSING A VIDEO OF SPORTS MOTION

CROSS REFERENCE TO RELATED APPLICATIONS

This application claims the benefit of and priority to U.S. Provisional Application Ser. No. 61/501,281 filed on Jun. 27, 2011, and New Zealand Application No. 595937 filed on Oct. 25, 2011, the entirety of which is incorporated by reference herein.

FIELD OF INVENTION

The invention relates to a method of analysing video images of a sports motion. More particularly, the invention relates to identification of key motion positions within a video and automatic extraction of segments of a video containing a sports motion.

BACKGROUND TO THE INVENTION

Participation in many sports involves repeating certain motions over and over again. The consistent ability to perform these motions in a particular way is usually critical to good performance in the sport. Different methods have been found to help participants develop the ability to repeatedly move in a certain way. Increasingly, technology is being used in such methods to improve performance in sports.

Video analysis is an important part of modern sports training. The ability to see oneself perform a motion helps an individual identify flaws in technique and correct them. Furthermore, video analysis techniques can be applied to video of a sports motion to help identify aspects of a motion that need changing or identify aspects of a motion performed correctly for positive feedback.

Taking golf as an example, a golfer's swing technique is critical to their ability to strike a golf ball consistently and therefore perform well. Over the years, a preferred golf swing technique has been identified and most golfers strive to model their swings as closely as possible to this preferred technique. Video analysis has been used in golf to improve golfers' swings.

A straightforward form of video analysis is simply to record a golf swing and watch it back to identify flaws that cannot be discerned by the golfer themselves or by a tutor. Video footage can be paused so that individual frames showing a particular swing position can be analysed.

Another analysis method is to display a person's golf swing next to that of another, to more easily identify differences compared to a model swing. Some existing methods involve synchronising the two swings so that corresponding swing positions are shown together, which makes comparison easier.

To analyse a golf swing, it is useful to examine certain swing positions, such as the address position, top swing position, impact position and finish position. It is therefore desirable to identify the video frames showing the golfer in those positions.

When capturing video footage of a golf swing, there may be a large amount of footage recorded either side of the swing itself, for example when a player is preparing to swing. Such footage is largely redundant and can make it difficult to quickly identify the actual swing motion and may take up precious memory space in the case of stored digital video data. It is therefore desirable to extract segments of video footage that contain just the golf swing motion.

Some existing methods of golf swing video analysis achieve these aims, i.e. extraction of a segment of video containing a golf swing or identification key swing positions, or both. It will be readily understood that identification of the address and finish positions allows the segment of video showing the golf swing to be extracted: the golf swing is shown in the portion of video in between the address and finish positions.

Examples of such existing methods are:

Manually examining the video swing footage and identifying the segment showing the golf swing and frames showing key motion positions. This is time intensive as it requires a user to look through all the video footage.

Detecting the noise of impact to identify the moment of impact, as in U.S. Pat. No. 6,537,076 and U.S. Pat. No. 6,567,536. The rest of the swing is assumed to be within a certain time either side of this moment. This method requires an audio detection device working with the video capture device and is only able to accurately detect the impact position. This method will not reliably work for swings of different tempos.

Using other types of sensor to detect parts of the swing, for example pressure mats, as in US 2006/0281060. However, this method requires the use of another type of sensor, which may be expensive and not always be convenient.

Placing colour markers or other identifiable labels on the golfer and golf club and automatically detecting their positions in the video footage, as in U.S. Pat. No. 7,097,459, U.S. Pat. No. 7,704,157 and U.S. Pat. No. 7,857,708. However, this requires the use of markers or labels which may not always be available and errors may occur if the markers are not placed in the correct locations, Using object recognition-based methods, such as identification of a player's silhouette or body segments, as in US 2010/0303303. However, these methods involve solving a difficult and time-consuming problem of human shape recognition before applying golf swing analysis methods. These methods are therefore very complex, require high levels of processing power/memory and take some time to product results.

Detecting the position of the ball in the video footage and how it changes during the motion, as in KR 101002846. While this method avoids the need for equipment beyond a video capture device and processor, it relies on the presence of a ball, which may not always be available. It also assumes the ball is covered by the club head during the address position and therefore is not useful for analysing video recorded from, an angle in which the ball is not covered by the club head at address. Finally, it estimates which frame shows the finish position by making certain assumptions which may not always be true.

In another method of analysing a golf swing, the position of the golf club is detected using straight line detection methods such as Hough or Radon transforms, as in U.S. Pat. No. 7,200,282. Such methods may be useful for segments of video in which the golf club is relatively stationary but they may not work as effectively if the club is moving quickly and the image is blurred. These methods are also computationally intensive.

Many of the above techniques can also be applied to motion analysis in other sports.

It is therefore an object of the invention to provide an improved method of analysing video images of sports motion that overcomes at least some of the disadvantages discussed above.

Video capture devices have become increasingly widespread in recent years. Video images can be captured on many personal electronic devices such as digital cameras and mobile phones. It has therefore become very easy for anyone to capture video footage of an individual executing a particular sports motion. It would be convenient if the same device used to capture video footage could be used to analyse the footage. It is therefore an alternative object of the invention to provide a method of analysing video images of sports motion that can be performed by a personal electronic device.

It is an alternative object of the invention to provide an improved apparatus and/or system for analysing video images of sports motion Alternatively, it is an object of the invention to at least provide the public with a useful choice.

SUMMARY OF THE INVENTION

According to a first aspect of the invention, there is provided a method of analysing a video, at least a portion of the video displaying a sports motion, the method comprising the steps of:
receiving data representative of a number T of image frames;
calculating, for each of a number $T_C$ of the image frames, one or more frame difference measures between the image frame and another image frame;
analysing the frame difference measures to identify a plurality of image frames that each show a key position of the sports motion.

Preferably, the method further comprises the step of identifying the portion of the video displaying the sports motion. More preferably, the step of identifying the portion of the video displaying the sports motion comprises selecting image frames between two of the key positions of the sports motion.

Preferably, the method further comprises identifying one or more motion phases of the sports motion from the frame difference measures. More preferably, the method comprises using identification of the motion phases to identify the key positions of the sports motion.

It will be understood that "frame difference measures" are quantities that are indicative of differences in the video data between image frames. In preferred embodiments of the invention, the one or more frame difference measures comprise one or more of the following:
1. a measure of the amount of movement between image frames;
2. a measure of the position of movement between image frames; and
3. a measure of the velocity or a derivative thereof (such as acceleration) of movement between image frames.

Each frame difference measure may be a global measure or local measure of the difference between frames. A global measure may be understood to be a measure at the level of substantially the whole image. A local measure may be understood to be a measure at the pixel or sub-image level.

Preferably, each image frame comprises a number P of pixels or groups of pixels and the method further comprises:
for each of the number $T_C$ of the image frames, comparing each of a number $P_C$ of pixels or groups of pixels with corresponding pixels or groups of pixels in the other image frame and calculating one or more pixel difference measures.

More preferably, the pixel difference measures comprise intensity differences between pixels or groups of pixels.

Preferably, the method comprises calculating the one or more frame difference measures based on the one or more pixel difference measures.

More preferably, the method comprises calculating statistical values of pixel difference measures between image frames. Preferably, the method comprises calculating statistical values of pixel difference measures exceeding a predetermined threshold. The pixel difference measures may comprise one or more of the following:
1. a measure of the amount of pixel movement between image frames;
2. a measure of the position of pixel movement between image frames; and
3. a measure of the velocity or a derivative thereof (such as acceleration) of pixel movement between image frames.

More preferably, the statistical values of pixel difference measures calculated may comprise one or more of: median, mean, nth-percentile, standard deviation.

In a second preferred embodiment of the invention, the method comprises:
for each of the number $T_C$ of the image frames, determining optical flow between the pixels or groups of pixels and the corresponding pixels or groups of pixels in the other image frame.

More preferably, the step of determining optical flow comprises determining local correlations between pixels or groups of pixels between each image frame and the other image frame.

In a preferred embodiment of the invention, the step of analysing the frame difference measures to identify a plurality of image frames that each show a key position of the sports motion comprises:
identifying a plurality of patterns in temporal variations in frame difference measures; and
associating each pattern with one of the motion phases of the sports motion.

Preferably, the step of identifying a plurality of patterns comprises identifying peaks and/or troughs in the temporal variations in frame difference measures.

More preferably, the step of identifying a plurality of patterns comprises identifying peaks and/or troughs in vertical pixel movements between image frames.

In certain embodiments of the invention, a decision model is used to analyse the frame difference measures to identify a plurality of image frames that each show a key position of the sports motion.

In a preferred embodiment of the invention, the method comprises the step of applying an image improvement algorithm to the video. For example, in one embodiment, an image stabilisation algorithm is applied to the video.

In one embodiment of the invention, the method comprises applying an image stabilisation algorithm comprising computing optical flow vectors and subsequently using the optical flow vectors to calculate the frame difference measures.

In one embodiment of the invention, the image improvement algorithm may comprise a contrast enhancement algorithm.

Preferably, the step of analysing the frame difference measures comprises applying a noise reduction filter to the temporal variations in frame difference measures.

Preferably, for each step of calculating the frame difference measures, the other image frame is separated from the image frame by a pre-determined number of image frames. More preferably, the other image frame is the previous or succeeding frame.

Preferably, the number $T_C$ of image frames for which frame difference measures are calculated is equal to the number T of image frames in the video data.

Preferably, the number $P_C$ of pixels or groups of pixels is equal to the number P of pixels or groups of pixels in the image frame.

Preferably, the method further comprises writing data representative of the image frames showing the key positions of the sports motion and/or the portion of the video displaying the sports motion to a computer-readable medium. The method may further comprise erasing all other data.

More preferably, the method comprises the step of outputting the image frames showing the key positions of the sports motion and/or the portion of the video displaying the sports motion on a display device.

Preferably, the method comprises recording the video on a video capture device. More preferably, the method of analysing the video is performed on the video capture device. In one embodiment, the video capture device is a mobile telephone.

Preferably, the method further comprises synchronising two sports motions and displaying the two sports motions together on the display device. The two sports motions may be alternative views of one person performing the sports motion or the same view of two people performing the sports motion. More preferably, the method of synchronising comprises displaying image frames of the key positions of each sports motion at the same time.

Preferably, the method further comprises calculating a value indicative of the duration of the sports motion. More preferably, the value indicative of the duration of the sports motion comprises the time elapsed between image frames showing two of the key positions.

In a preferred embodiment of the invention, the sports motion is a golf swing.

In a preferred embodiment of the invention, the method further comprises identifying an object in one or more of the image frames. More preferably, the method comprises identifying the object in at least one of the image frames showing one of the key positions of the sports motion.

For example, the method comprises identifying a golf club in one or more image frames, and particularly the images frames showing address and finish positions. Hough or Radon transform methods may be used to identify the golf club.

Preferably, the method comprises constructing one or more lines and displaying the line(s) on one or more of the image frames.

For example, in one embodiment the method comprises constructing a first line through the golf club in the address position and a second line at approximately 17° to the first line (above the first line) and displaying the lines in one or more image frames of the side view of a golfer. In another embodiment, the method comprises constructing a vertical line approximately through the golf club and displaying the line in one or more image frames of a front view, of a golfer.

Preferably, the method further comprises analysing the image frames and providing improvement instructions as a result.

According to a second aspect of the invention, there is provided an apparatus for analysing a video, at least a portion of the video displaying a sports motion, the apparatus comprising:

means for receiving data representative of a number T of image frames;

means for calculating, for each of a number $T_C$ of the image frames, one or more frame difference measures between the image frame and another image frame;

means for analysing the frame difference measures to identify a plurality of image frames that each show a key position of the sports motion.

Preferably, the apparatus further comprises a video capture device for recording the video. More preferably, the apparatus further comprises display means for displaying the key position image frames.

In a preferred embodiment of the invention, the apparatus comprises a mobile telephone, a mobile tablet, or a laptop computer.

According to a third aspect of the invention, there is provided a system for analysing a video, at least a portion of the video displaying a sports motion, the system comprising:

means for receiving data representative of a number T of image frames;

means for calculating, for each of a number $T_C$ of the image frames, one or more frame difference measures between the image frame and another image frame;

means for analysing the frame difference measures to identify a plurality of image frames that each show a key position of the sports motion.

According to a fourth aspect of the invention, there is provided a computer program product which, when executed by a computer, causes the computer to perform a method comprising the steps of:

receiving data representative of a number T of image frames;

calculating, for each of a number $T_C$ of the image frames, one or more frame difference measures between the image frame and another image frame;

analysing the frame difference measures to identify a plurality of image frames that each show a key position of the sports motion.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

One or more embodiments of the invention will be described below by way of example only, and without intending to be limiting, with reference to the following drawings, in which:

FIG. 9 is an illustration of images showing key swing positions according to another embodiment of the invention.

DETAILED DESCRIPTION OF PREFERRED EMBODIMENTS OF THE INVENTION

In the following description, embodiments of the invention relating to the analysis of a golf swing will be described. While this is one application of the invention, it will be understood that such embodiments are described by way of example only and, in other embodiments of the invention, other sports motions are analysed.

For example, as well as golf swings, embodiments of the invention can be used to analyse a baseball bat swing, a baseball pitch, cricket shots, rugby kicking, tennis shots, and other sports motions. The invention is not limited to use for any particular sports motions and one of skill in the art will readily understand, upon reading the following description, how the invention can be applied to analyse sports motions not discussed herein.

Figure 1:
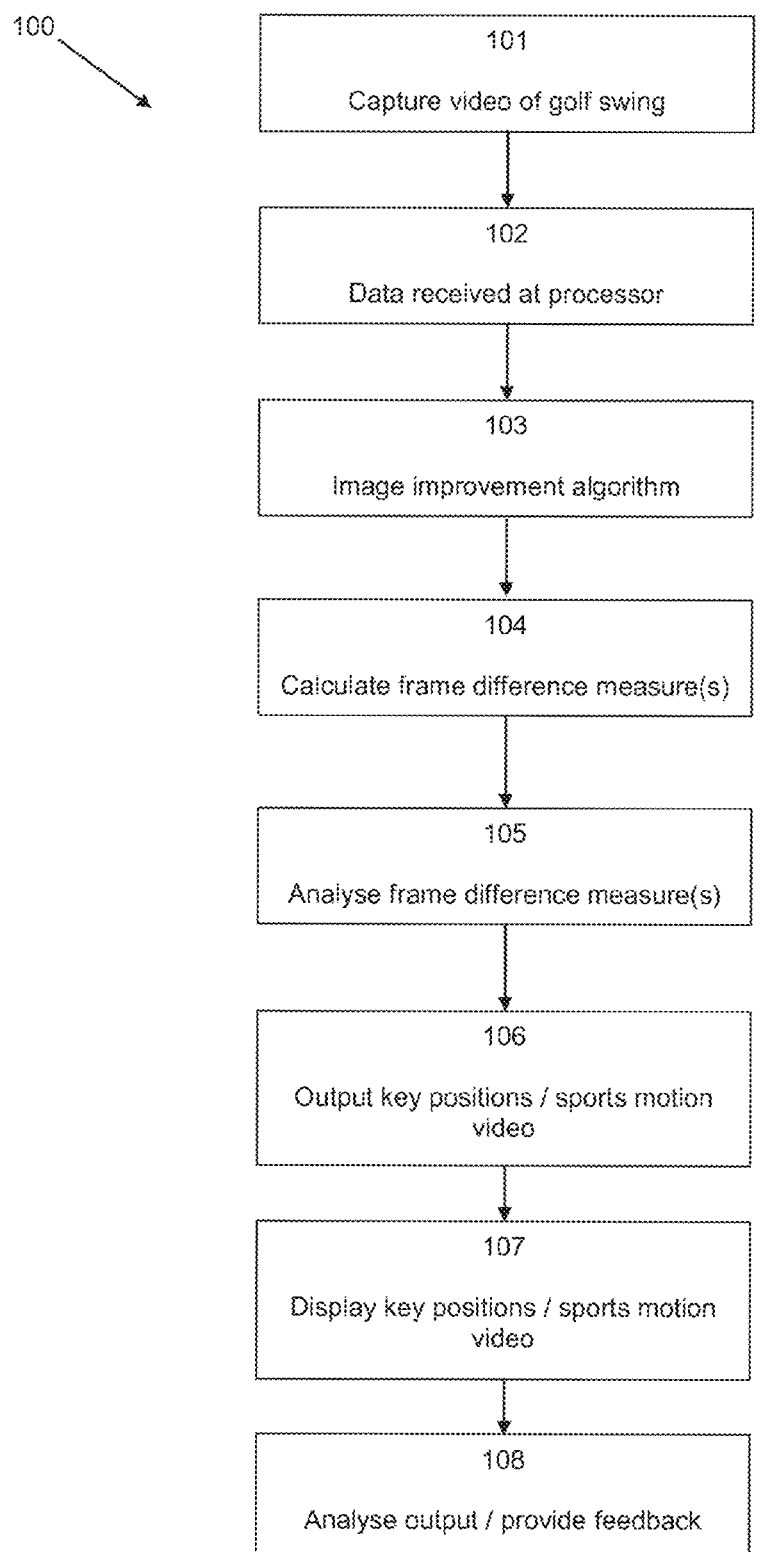
FIG. 1 is a flow chart illustrating a method of analysing a golf swing according to an embodiment of the invention.
Figure 2:
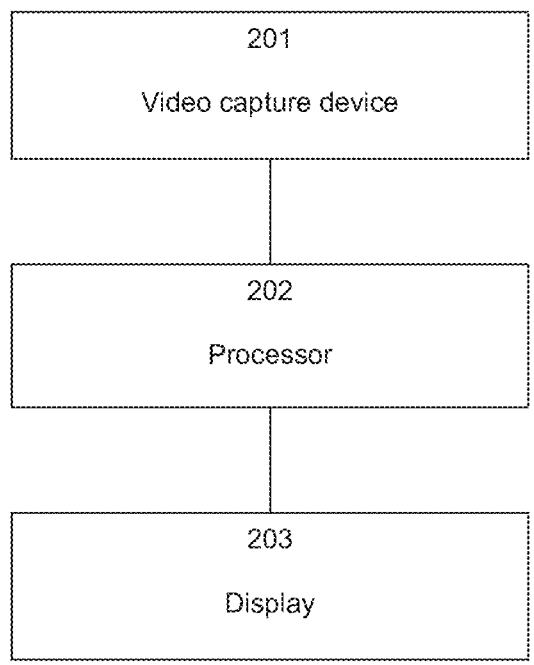
FIG. 2 is an illustration of a system or apparatus for analysing the golf swing according to an embodiment of the invention.

FIG. 1 is a flow chart illustrating a method 100 of analysing a golf swing according to an embodiment of the invention. FIG. 2 is an illustration of a system or apparatus 200 for analysing the golf swing according to the same embodiment of the invention.

At step 101, a video is recorded of an individual making a golf swing. The video may include some redundant footage, i.e. portions of the video not showing the actual golf swing but the player setting up or preparing to swing, etc. The video may be recorded on any video capture device 201 and in some embodiments an easily portable digital device is used, such as a camcorder, digital camera, mobile phone, tablet computer or the like. The convenience of being able to record and analyse a golf swing anywhere is an advantage of some embodiments of the invention.

In the case of a digital video recording, the end result of step 101 is digital data representative of image frames that collectively constitute the video. Such data may be stored on the video capture device or on any suitable data storage medium, such as a hard drive, memory card, CD, floppy disc or the like.

At step 102, the representative data is received at a computer or processor 202 suitable for carrying out analysis steps according to the invention. In some embodiments, processor 202 is embodied in the same apparatus 201 used to capture the video, e.g. a mobile phone, so that only a single device is required to capture and analyse the video and display the results of the analysis.

At step 103, the method may include the step of applying an image improvement algorithm to the video data. Such an algorithm may be used to improve the quality of the data and thereby improve the results of the analysis method. Examples of image improvement algorithms that may be used include image stabilisation algorithms, contrast enhancement algorithms, noise reduction algorithms and the like. An image stabilisation algorithm helps to reduce the effects of a camera shaking, for example if the camera is held in someone's hands, which can reduce the quality of the results obtained. A contrast enhancement algorithm may be particularly useful where light quality in the captured video is poor, which may occur, for example with video captured at a golf driving range since these are commonly in the shade. Suitable algorithms are well known in the art and will not be discussed in more detail.

At step 104, processor 202 calculates frame difference measures for a plurality of the image frames received by the processor. In the context of this invention, frame difference measures are quantities that are indicative of differences in the video data between image frames. This step will be explained in more detail below.

At step 105, processor 202 analyses the frame difference measures, for example by applying a decision model to the calculated frame difference measures. This step will also be explained in more detail below.

At step 106, processor 202 outputs the results of the analysis at step 105. In one embodiment of the invention, the analysis results comprise a plurality of image frames that each show a key position of the sports motion and the portion of the video displaying the sports motion, i.e. without any of the redundant video segments.

Key positions of the sports motion will be understood to mean any position which is considered important in the analysis of the sports motion. What those key positions are depends on the sports motion being analysed and the person involved: different people may place various degrees of significance on different positions within an individual sports motion. In the example of analysis of a golf swing, key positions are commonly considered to be the position of the golfer at address, mid-point of backswing, top of backswing, mid-point of downswing, impact and follow-through. However, these positions are mentioned by way of example only and any other position in a golf swing may be considered key. For example, a position of a sports motion may be considered to be key merely in view of the fact that it is selected for display to a user.

The portion of the video displaying the sports motion without any redundant video on either side of the motion will be often, but not always, that portion of the video between the first and last key positions. In the case of a golf swing, the relevant video portion comprises all the image frames between the frame showing the address position and the address showing the follow-through or finish position. In other embodiments, other portions of the video may be extracted as required. The start or end of the required video segment may be related to certain key positions in a particular way, for example within a certain time or number of frames from the first and last key positions.

At step 107, the results of the analysis outputted by processor 202 are displayed on display means 203. Display means 203 may comprise any suitable device able to display image frames and video footage, as is known in the art. In some embodiments, display means 203 is embodied in the same apparatus as processor 202 and/or video capture device 201. For example, display means 203 may comprise the screen on a mobile phone.

At step 108, the outputted results may be further automatically analysed and feedback provided in the form of improvement instructions. For example, in the case of a golf swing, the position of the golf club at address may be detected (discussed below). If the golf club is at too great or small an angle, this can be detected and appropriate feedback provided, e.g. ("stand nearer/further away from the ball").

The manner in which analysis results are displayed according to some embodiments of the invention will be described below.

Figure 3:
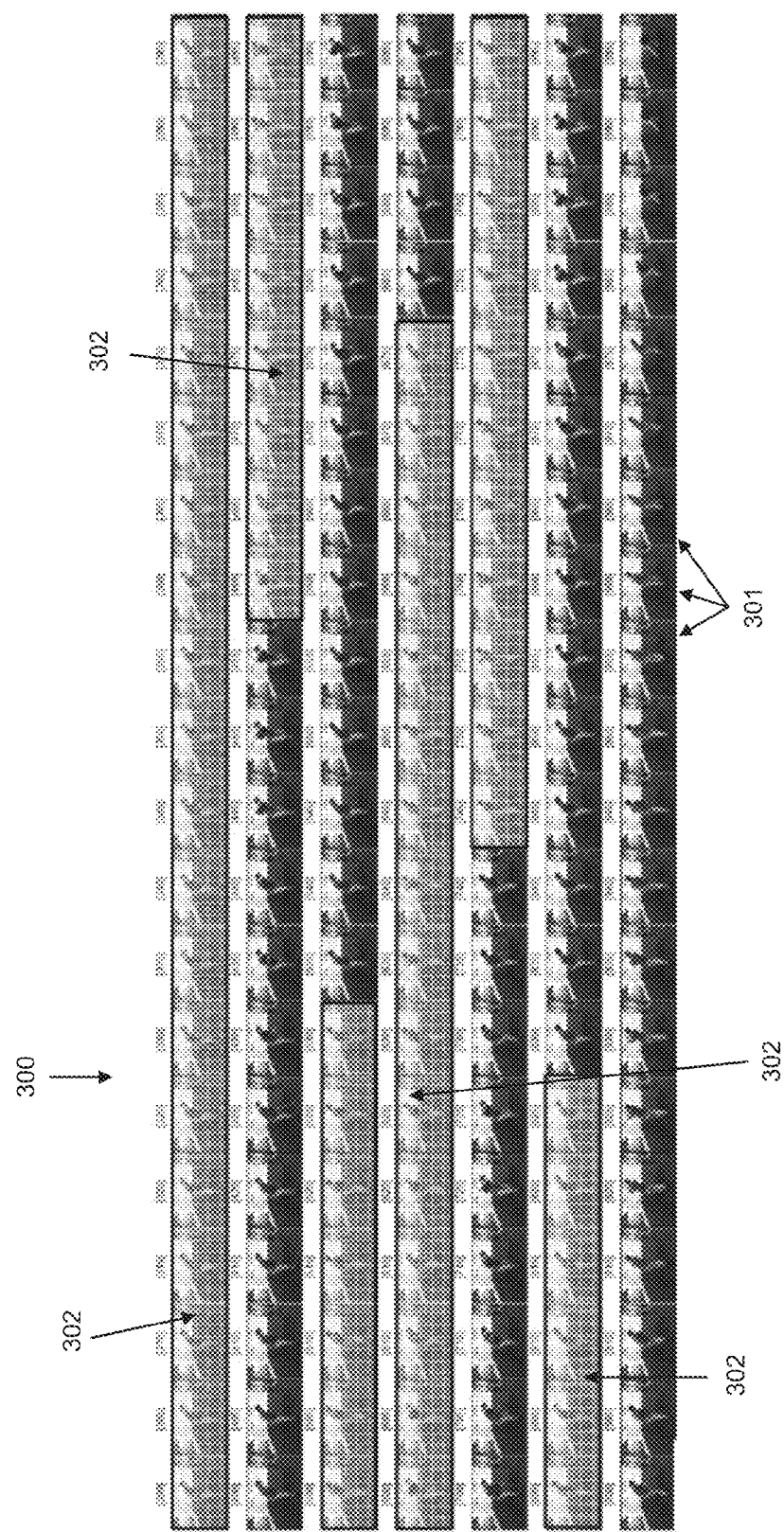
FIG. 3 is an illustration of a plurality of image frames constituting a video of a golfer according to an embodiment of the invention.

FIG. 3 is an illustration of a plurality of image frames 301 constituting a video 300 of a golfer according to an embodiment of the invention. The video recording is approximately 23 seconds in duration taken at 30 frames per second (fps). Only one in every five image frames are shown in FIG. 3 for convenience. During the video, the golfer made four full golf swings and the image frames showing these swings are highlighted and marked as 302.

Video 300 is a sequence of T image frames X(t), each represented as data. Each image frame X consists of $P=[n_r \times n_c]$ pixels, where $n_r$ is the number of rows of pixels and $n_c$ is the number of columns of pixels in the image frame. The image frames can be represented as:

$$X(t)=[x(t)_{ij}], \text{ where } i=1, 2, \ldots, n_r, j=1, 2, \ldots, n_c$$
$$\text{and } t=1, 2, \ldots, T.$$

Figure 4:
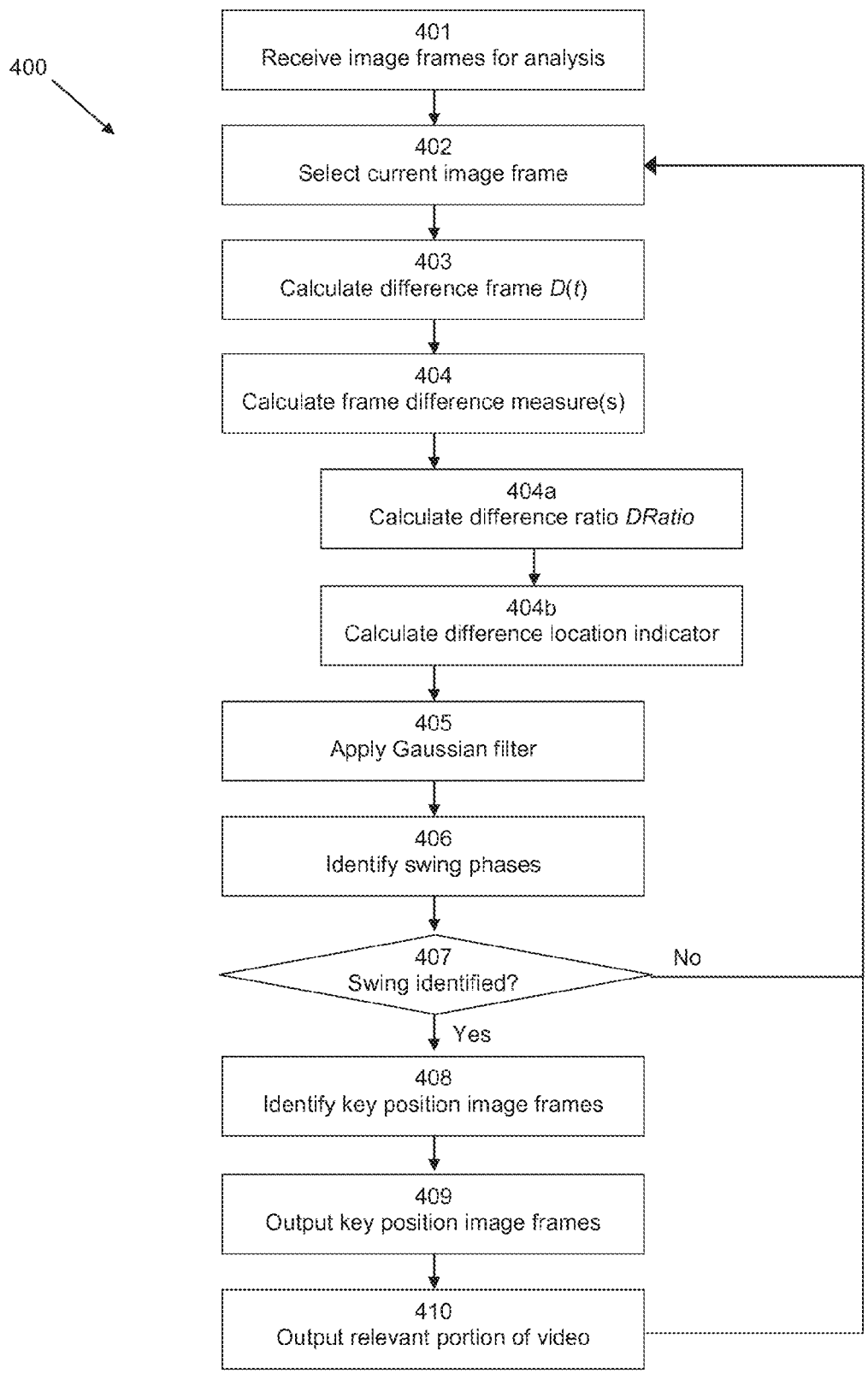
FIG. 4 is a flow chart illustrating steps in a method of analysing video data according to one embodiment of the invention.

FIG. 4 is a flow chart illustrating steps in a method 400 of analysing video data according to one embodiment of the invention. The method 400 illustrated in FIG. 4 may be implemented in an online video analysis method.

At step 401, $T_C$ image frames are used for analysis. $T_C$ may be equal to or less than T. In the embodiment discussed, $T_C=T$ so that all the available data is analysed. However, processing can be speeded up if only a subset of the available frames are analysed, although a sufficient number of frames must be analysed to achieve the required results. In the case of high speed video (e.g. 30 or more frames per second), not all of the image frames may need to be used for faster processing and to ensure there are sufficient changes in image between frames so that a meaningful comparison between image frames can be made.

The image frames may be processed as grey scale images of pixel intensity x, where x(t) is a member of [0, max pixel intensity]. Using grey scale simplifies the method. In other embodiments, other measures may be used, for example, colour components in a pixel.

At step 402, the current image frame for analysis is selected. In one embodiment, the method may work sequentially through image frames in the video to be analysed. In another embodiment, the method may first work through every few frames to try to obtain results without analysing every frame, only analysing the other frames if required. In other embodiments, other ways of selecting the order of image frames for analysis may be used.

At step 403, the difference frame or difference image D(t) is calculated. The difference frame is the absolute difference between each of $P_C$ pixels of the current image frame X(t) and the corresponding pixels of another image frame in the past or future X(t m), where m is the number of frames before t:

$$D(t)=|X(t)-X(t-m)|.$$

In other embodiments, D(t) is calculated as another difference function of corresponding pixels. For example, difference image D(t) may be the squared difference, transformed difference, log of the absolute difference, difference of the logs, etc.

In some embodiments, $m=\pm 1$. That is, the difference frame is based on the difference between the previous or succeeding image frame. However, m can be any integer. Integers higher than 1 may be used, for example, in the case of high speed video for faster processing and to detect greater changes in the image between frames.

In one embodiment, $P_C=P$, that is all of the pixels in an image frame are compared to the pixels in the other image frame. However, in some embodiments, $P_C$ is less than P such that only a subset of pixels is compared in each frame or down-sampled (i.e. reduced resolution) frames are compared. This may increase efficiency, particularly in the case of high resolution imagery where adequate results can be achieved without processing all pixels. In another embodiment, pixel groups are compared between frames.

At step 404, one or more frame difference measures are calculated. In the presently discussed embodiment, in which the image frames are comprised of pixels, the frame difference measures comprise pixel difference measures between frames or statistical values thereof. For example, at step 404a, a difference ratio DRatio($d_{thres}$) is calculated. The difference ratio is the proportion of pixels in the difference image D that exceed a pre-determined intensity threshold $d_{thres}$:

$$DRatio(d_{thres})=\text{count}([d_{ij}] \geq d_{thres})/(n_r \times n_c).$$

The difference ratio is a measure of the amount of movement in the difference image, i.e. the amount of movement between image frames. It is a global measure because it relates to the image frame as a whole (as opposed to local measures of movement at the pixel or sub-image level). A high value of DRatio($d_{thres}$) indicates large movements between frames. It is invariant against rotational transformation of images.

At step 404b, a difference location indicator is calculated. Given a chosen intensity threshold $e_{thres}$, a binary matrix E that corresponds to pixels in D that exceed $e_{thres}$ can be defined as:

$$E=[d_{ij}] \geq e_{thres}.$$

Let $e_h=[\Sigma_i(e_{i,1}) \Sigma_i(e_{i,2}) \ldots \Sigma_i(e_{i,j})]$ be the vector of column sum of E, and $e_v=[\Sigma_j(e_{1,j}) \Sigma j (e_{2,j}) \ldots \Sigma_j(e_{i,j})]$ be the vector of row sum of E. The following difference location indicators are defined as:

Horizon difference location indicator:
HDPrctile(p)=pth-Percentile($e_h$)

Vertical difference location indicator:
VDPrctile(p)=pth-Percentile($e_v$)

The horizontal and vertical difference location indicators defined above are measures of the position of movement between image frames. The value of p may be anything but may, for example, be chosen from [5, 25, 50, 75, 95] and multiple values may also be used to give more than one difference location indicator.

Figure 5:
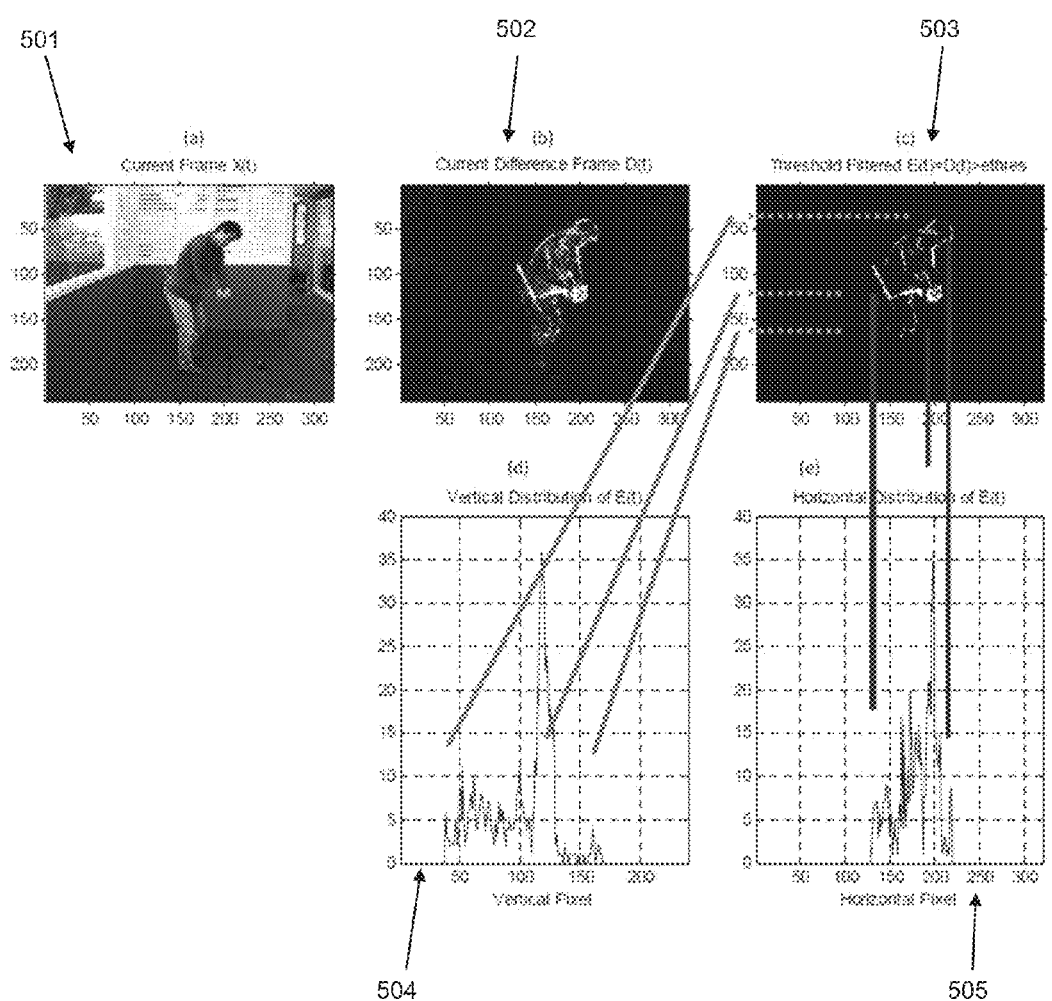
FIG. 5 is an illustration of the results of analysis according to one embodiment of the invention.

FIG. 5 is an illustration of the results of analysis according to one embodiment of the invention. FIG. 5 illustrates a frame 501 being analysed X(t). Frame 501 is an image of a golfer part of the way through a golf swing. The difference frame D(t) is shown in image 502. This shows all pixels that differ between frame 501 and the comparison frame, which in this example is the immediately preceding frame. Image 503 shows the position of pixels in the difference frame exceeding a predetermined threshold $e_{thres}$. Graphs 504 and 505 show the vertical and horizontal distributions respectively of the pixels in the difference frame exceeding the predetermined threshold $e_{thres}$. The lines connecting graphs 504 and 505 with image 503 show the approximate positions of the $5^{th}$, $50^{th}$ and $95^{th}$ percentiles, i.e. three different values of each of HDPrctile(p) and VDPrctile(p) with p equal to 5, 50 and 95.

Figure 6:
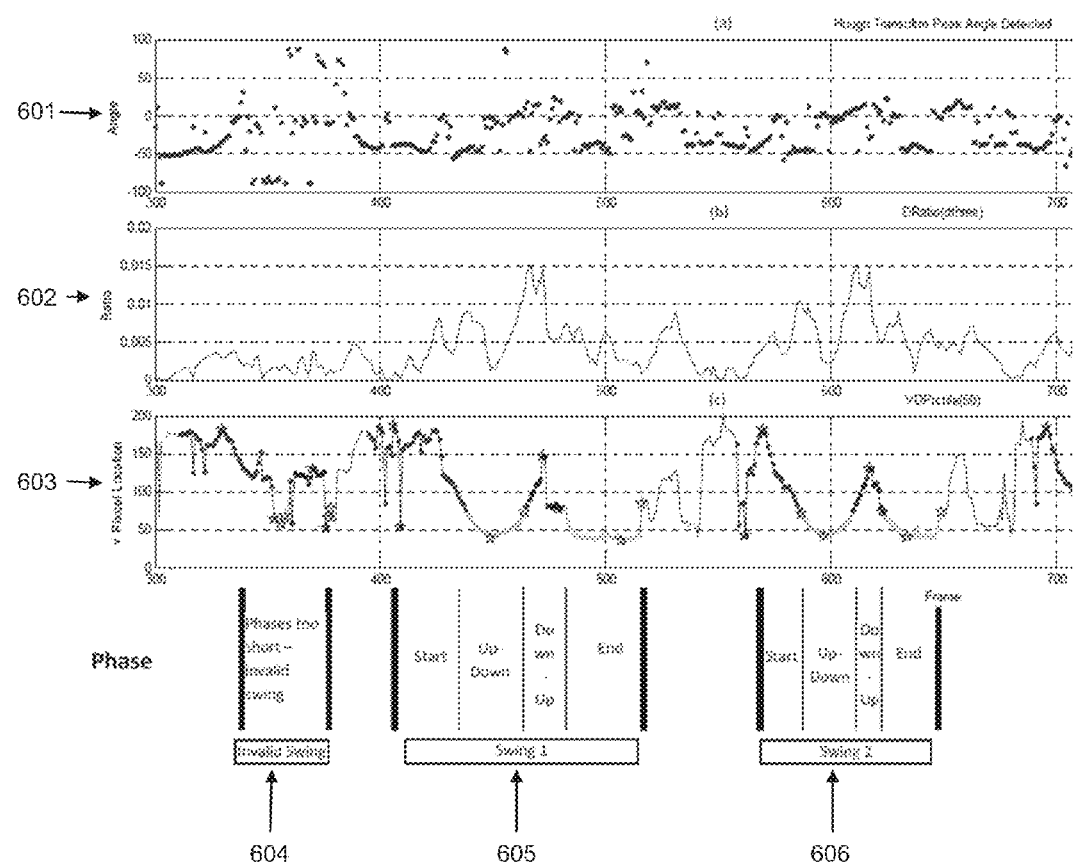
FIG. 6 is an illustration of data calculated by a method according to one embodiment of the invention.

FIG. 6 is an illustration of data relating to a number of image frames calculated by a method according to one embodiment of the invention. Graph 602 is a plot of the measure of the amount of movement between image frames, DRatio, against time (or frame number). Graph 603 is a plot of the measure of the position of movement between image frames, VDPrctile(50), against time. VDPrctile(50) is the median of the vertical position of pixels exceeding a certain threshold in the difference frame. Note that the labels on the y-axis of graph 603 are opposite to the way the data is plotted, in fact y=0 is at the top of the graph and y=200 is at the bottom.

Referring again to FIG. 4, the steps of analysing the frame difference measure(s) to identify key positions in the golfer's swing according to one embodiment of the invention will now be described. In this embodiment, a simple temporal recognition strategy is used. The details of the method discussed below are relevant to analysing a side view video of a golfer (as per FIG. 3).

At step 405, a Gaussian filter may be applied to the temporal frame difference measure data calculated so far to reduce noise in the data.

At step 406, swing phases are attempted to be identified in the frame difference measure data. Areas 604, 605 and 606 show the results of identifying swing phases in the data of graphs 602 and 603. Area 604 shows a pattern that does not represent a full swing, Areas 605 and 606 indicate the swing phases correlated to patterns in the frame difference measure data. More particularly, four distinct swing phases are identified. In FIG. 6, these swing phases are called "start", "up-down", "down-up" and "end". Each swing phase is characterised by a pattern in the frame difference measure data. For example, during the start and end phases, the value of DRatio is relatively small, indicating little overall motion. In the middle of the up-down phase DRatio and VDPrctile(50) hit troughs simultaneously (so in graph 603, VDPrctile(50) is high since the y-axis is inverted), indicating the top of the backswing where movement is minimal and the movement position is at its highest point. During the down-up phase or downswing, DRatio is highest because body movement is at a maximum. Commonly used peak detection methods may be used to identify peaks or troughs in the data.

A complete swing must contain all 4 phases in succession. Therefore detection of the characterising pattern particular to that swing phase and a row of the 4 phases in succession is used to identify a complete swing in the data. A successful swing recognition can also be validated, for example by assessing the duration of each phase. In the case of video recording at 30 frames per second, each swing phase should be no longer than around 60 frames for most golf swings.

At decision step 407, it is determined whether a swing has been identified. For example, detection of a swing may require the detection of all 4 swing phases to be detected in succession. If a swing has not been identified, the method loops back to step 402, analysing the data in another image frame in the video data. If a swing has been identified, the method moves on to step 409.

Figure 7:
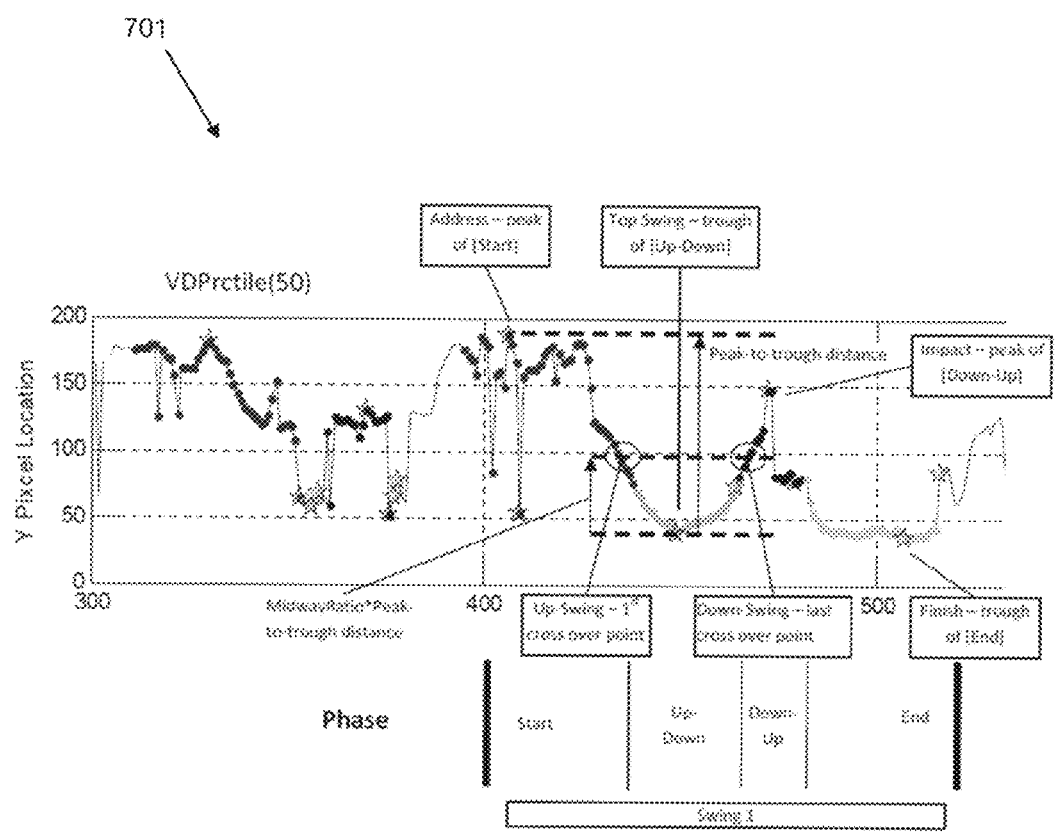
FIG. 7 is an illustration of part of one of the graphs shown in FIG. 6.

At step 408, image frames showing key positions of the swing are identified based on the identified swing phases in the data. FIG. 7 is an illustration of part of graph 603 as shown in FIG. 6. Graph 701 shown in FIG. 7 is a part of graph 603 including data representing the first complete swing.

Examples of how image frames showing key swing positions are identified are explained below:
  Address—position of the dominant peak in VDPrctile(50) in the start phase;
  Top swing—position of the dominant trough in VDPrctile (50) in the up-down phase;
  Impact—position of the dominant peak in VDPrctile(50) in the down-up phase;
  Finish—position of the dominant trough in VDPrctile(50) in the end phase; and
  Upswing and downswing—if Peak-to-Trough=dominant peak in VDPrctile(50) in start phase—dominant trough in VDPrctile(50) in up-down phase, and CrossRatio=a chosen ratio of Peak-to-Trough for determining upswing and downswing positions, then the upswing and downswing frames=first and last positions between address frame and impact frame at which VDPrctile (50) crosses (CrossRatio*Peak-to-Trough) above the trough, respectively. In one embodiment, CrossRatio is approximately equal to 0.3. In another embodiment, 0.5 may be chosen.

In some embodiments of the invention, object detection methods can be used to identify certain objects in the sports motion and, optionally, use the object detection to help or validate identification of swing phases and/or key positions. In the case of golf swing analysis, golf club detection methods can be used, for example straight line detection algorithms.

Referring again to FIG. 6, graph 601 shows the result of peak angle detection in a Hough transform of the image frames. That is, the data in graph 601 is representative of the angle of the golf club in the image frames. In alternative embodiments, Radon transforms or any other suitable algorithm may be used. The most accurate identification of club angle and position can be made at the address and finish positions where the club is relatively stationary.

Figure 8:
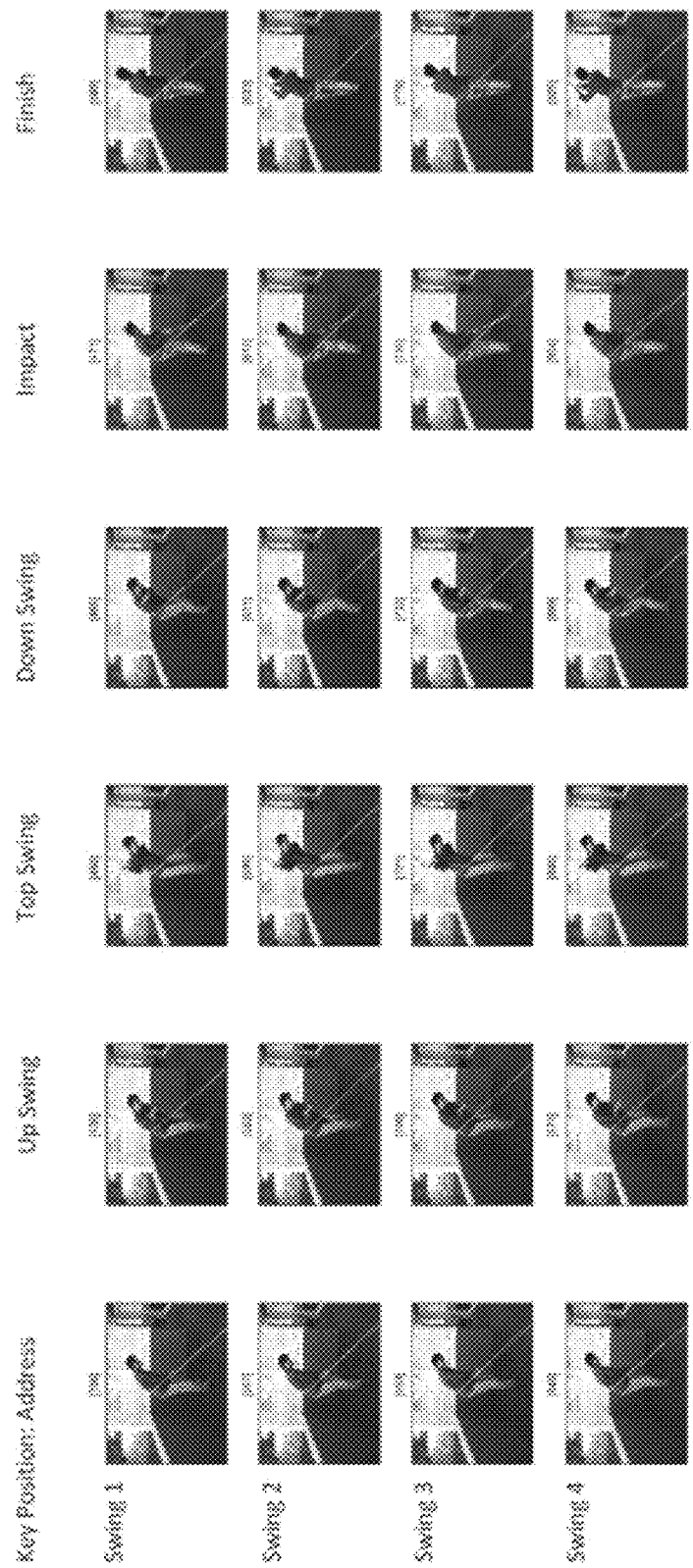
FIG. 8 is an illustration of images showing key swing positions when a method according to an embodiment of the invention is applied to the video data shown in FIG. 3.

At step 409 in FIG. 4, the image frames in which the key swing positions are shown are output. FIG. 8 is an illustration of images showing key swing positions when a method according to an embodiment of the invention is applied to the video data shown in FIG. 3. For each of the four swings in the recorded video, six key positions are provided. In the embodiment shown, an object detection algorithm has been applied to indicate the position of the golf club at address. This is shown by a line in all the frames.

At step 410, the portion of the initially recorded video showing the golf swing(s) is outputted. This is output in the form of video data comprising the image frames between the address and finish position, and may also comprise a few image frames either side of these positions if desired. In the case of the video shown in FIG. 3, there would be four short video segments outputted, each showing one of the swings recorded.

Only outputting the key position frames and not the extracted golf swing segments may be advantageous because of a reduction in memory requirements and processing speed.

After step 410, the method may return to step 402 to continue analysing the video for any more swings that may be present.

It should be noted that some of the method steps of the invention may occur simultaneously or in different order. The steps of FIG. 4 are shown one after the other for explanatory purposes only. By performing some steps of the method simultaneously as appropriate, the method of the invention is able to cater for "real time" operation, or at least very short processing times.

FIG. 9 is an illustration of images showing key swing positions according to another embodiment of the invention. FIG. 9 shows key swing positions of an "expert's" swing 901 and these are aligned with equivalent key swing positions from three swings by a subject 902. Displaying image frames in this way is extremely useful for the subject to compare their swing with that of an expert.

In the image frames of FIG. 9, a first line 903 is displayed in all frames marking the position of the golf club in the address frame. This line is constructed in a preferred embodiment using an object detection algorithm such as a Hough transform. A second line 904 may also be constructed and displayed. It has been found that drawing second line 904 at approximately 17° to first line 903 (where this angle is subtended at the head of the golf club) provides a useful teaching tool. Second line 904 may pass across the golfer's shoulders. It may be desirable to see the position of certain parts of the body with respect to second line 904, for example the golfer's hands should be roughly in between first line 903 and second line 904 at impact.

In another embodiment in which the front view of a golfer is analysed it may be useful to construct and display a vertical line approximately extending through the golf club at the address position. Again an appropriate object detection algorithm could be used to achieve this. This may be useful to see the movement of the golfer's head relative to this line over the course of a swing.

In one embodiment of the invention, only the frame difference measure DRatio is used to identify the swing phases and hence key frame positions. In another embodiment, the amount of movement in the vertical direction may be the frame difference measure used to identify the swing phases and hence key frame positions. Different measures may provide different advantages in the identification of a sports motion and therefore may be useful in different circumstances. In other embodiments, more than one frame difference measure is used and cross-validation between the measures can increase the accuracy of the motion analysis method. The rules for identifying different swing phases and key positions may need to be changed according to which measure is used.

As discussed above, frame difference measures may include HDPrctile(p) and VDPrctile(p), i.e. the vertical and horizontal distributions respectively of the pixels in the difference frame exceeding the predetermined threshold. In some cases, it may be more beneficial to calculate such distributions along a rotated angle so that the movement variance more accurately predicts the captured motion. For example, in the case of a golf swing, the distribution in a direction parallel to the plane of the club at the address position may be calculated. The distribution in a direction perpendicular to the plane of the club at the address position may not produce optimal results because there will be minimal movement of the golf club in this direction.

The example discussed above explains how swing phases and therefore key positions can be identified in video data of a golf swing captured from behind. The rules for identifying said swing phases and key positions are limited to a video showing this type of sports motion from this particular angle. However, the principles can be easily adapted to extend the method to recognise motion phases and key positions from other angles and for other sports once the appropriate patterns in the frame difference measures have been identified.

In the example discussed above, a rule-based model is used to identify the swing phases and key positions from the frame difference measures. In other embodiments, other predictive and/or machine learning models for the classification, recognition and regression of data may be used, such as the Hidden Markov Model, State-Space Model, Finite State Machine, regression methods, Support Vector Machine, Neural Networks and Fuzzy Logics. Methods which take advantage of machine-learning techniques are particularly advantageous when encountering the task of learning and classifying many different types of sports motions.

In an alternative embodiment of the invention, calculation of a frame difference measure that is a measure of the velocity of movement between image frames is used to analyse the sports motion video. For example, the velocity (comprised of both speed and direction) of pixel movements between image frames is calculated.

Velocity of pixel movements for all pixels between adjacent frames may be calculated using optical flow techniques in one embodiment of the invention. Any known optical flow techniques may be applied to pixels or groups of pixels in the image frames, which use a neighbourhood correlation function to derive values of pixel movement velocities. These velocities are frame difference measures which can be plotted against time and analysed to identify swing phases and key position image frames in a similar manner as has been described.

In embodiments of the invention in which optical flow techniques are used, it may be advantageous to apply an image stabilisation algorithm since optical flow vectors may be computed as part of image stabilisation algorithms (as described in, for example, H. Farid and J. B. Woodward. Video Stabilization and Enhancement. TR2007-605, Department of Computer Science, Dartmouth College, September 2007), which can be used later in the analysis method, thus gaining the advantages of using the image stabilisation algorithm and improving processing speeds.

Optical flow techniques may be more computationally intensive than the methods discussed in relation to FIG. 4, above, because optical flow techniques compute local estimates of pixel/pixel group velocity for each pixel/pixel group of interest.

In some embodiments of the invention, there is provided a computer program product embodying the inventive method. For example, a program able to carry out the analysis of the invention on video data may be able to be installed on a computer or computing device such as a mobile phone or tablet. In one embodiment, the computer program product is available as a downloadable product which can be installed on devices. For example, the computer program product may be supplied as an app on a mobile phone.

There is provided below pseudocode for a computer program product configured to carry out part of a sports analysis method according to one embodiment of the invention:

```
last_phase = "Null";
Loop over all frames - for t=2 to T (t is the current frame number),
    Obtain current difference frame D(t);
    call COMPUTE_CURRENT_DIFFERENCE_FRAME_STATISTICS;
    call SMOOTH_DIFFERENCE_FRAME_STATISTICS;
    call COMPUTE_CURRENT_PHASE;
    if current_phase <> last_phase then do;
        call SUMMARIZE_LAST_PHASE;
        if last_phase="End" then DETECT_KEY_FRAMES;
```

```
        end;
        last_phase = current_phase;
end;
FUNCTION COMPUTE_CURRENT_DIFFERENCE_FRAME_STATISTICS;
Choose values for D_THRES, E_THRES, p(multiple values of p may be required)
Calcualte from D(t)
    difference-ratio (DRatio(D_THRES))
    horizontal and vertical difference-locations (HDPrctile(E_THRES,p),
    VDPrctile(p))
    the peak straightline angle (PeakAngle) and its line position (LinePosition)
    detected through Hough transform (required only when phase=("Null" or
    "Address" or "End"))
FUNCTION SMOOTH_DIFFERENCE_FRAME_STATISTICS;
    Apply Gaussian filter for time-smoothing of (DRatio(D_THRES),
    HDPrctile(E_THRES,p),VDPrctile(p))
FUNCTION COMPUTE_CURRENT_PHASE;
Choose values for D_THRES1-D_THRES5, V_THRES1
if DRatio(D_THRES)<D_THRES1 and VDPrctile(p)>V_THRES1 and last_phase="Null"
        and [-50>PeakAngle>-40] then current_phase="Address";
else if VDPrctile(50)<D_THRES2 and last_phase="Address" then current_phase="Up-
        Down";
else if VDPrctile(50)>D_THRES3 and last_phase="Up-Down" then
        current_phase="Down-Up";
else if VDPrctile(50)<D_THRES4 and last_phase="Down-Up" then
        current_phase="End";
else if VDPrctile(50)>D_THRES5 and last_phase="End" then current_phase="Null";
FUNCTION SUMMARIZE_LAST_PHASE;
Calculate and record:
1) The first and last frame number and total duration of the last phase
2) The position of prominent peaks and troughs in [DRatio(D_THRES),
HDPrctile(p),VDPrctile(p)] in the last phase
FUNCTION DETECT_KEY_FRAMES;
Check validity of all phases by ensuring the time durations, difference
statistics, and peak angles are within pre-defined limits. For example, each
phase should be no longer than 60 frames long (for 30 fps video).
if pass all phase validation checks then
One complete swing detected:
    Apply rules in FIG. 4 to extract the key frames [Address, Up-Swing, Top-
    Swing, Down-Swing, Impact, Finish]
    Use PeakAngle and LinePosition detected at [Address] as the initial club
    angle
    Output and Save:
        1. key frames
        2. club angle and line at [Address]
        3. Optional - the video sequence from [Address] to [Finish]
end;
```

Embodiments of the present invention are particularly advantageous for analysing sports motion because of the simplicity of implementation. No special equipment is required and, in some embodiments, only a single device, such as a mobile phone, is required to implement the invention. In the case of a golf swing, a golf club (or equivalent length of rigid material) may be required but the analysis can be performed without the need for a golfball.

Devices which implement the invention are extremely simple to use; once installed on a mobile phone, for example, all that is required is pointing the camera at a golfer, pressing simple buttons (such as start recording and stop recording) and the results are automatically produced. All that is required is a reasonably stable camera, although there is some tolerance to shaking, particularly if image stabilisation methods are used.

The analysis method of the invention is very fast to compute and needs only small amounts of processing power and a small memory buffer since, in embodiments in which some of the method steps are performed simultaneously, the method may require only a single pass through the video. Therefore, it is applicable to memory- and computationally-limited devices such as digital cameras, mobile phones and tablets. As a result, the invention can easily be implemented anywhere.

The use of memory is further maximised by only keeping the image frames that are required—i.e. the key position image frames and, in some embodiments, the video of the swing segment. As discussed above, the invention can be used to analysis many sports motions from almost any angle. Different rules for identifying motion phases/key position frames may be required for analysis from different angles. It is also preferable that the camera is at such an angle that there is a reasonable degree of movement in one or more directions in the image frame; a camera angle in the plane of movement may produce less satisfactory results.

Once key motion positions and the extracted segment of video are produced, there are many different ways of presenting them to a user to aid in sports coaching or the like. For example, two different views of the same person performing the sports motion can be provided on a single screen, with corresponding key motion positions from each view displayed simultaneously. Alternatively, views of different people performing a sports motion can be displayed side-by-side to aid learning, for example comparing one person with an expert's sports motion.

Any suitable means for controlling how the information is displayed and able to be manipulated by a user may be provided. For example, in one embodiment, the image frames are presented on a mobile phone screen with buttons allowing the user to switch between key positions, watch the full video, compare with an expert, etc. The invention is not limited by how the results of the analysis method are displayed to a user.

In one embodiment, further automatic analysis may be carried out on one or more of the key position frames identified by the method, for example, identification of errors in body position or the like. The results of the further analysis can be presented to a user in any form. Certain feedback in the form of improvement instructions may also be provided as a result of the further analysis.

In one embodiment, a value indicative of the duration of the sports motion is output. This is simply calculated according to the number of frames and frame rate. In the case of a golf swing, the duration of the golf swing can be output, which may be useful for comparison between swings and between players. In golf, the rhythm of a swing is considered to be, important.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A computer-implemented method of analysing a video for improving sports training of a person, the method comprising:
   receiving data representative of a number T of image frames constituting the video, wherein at least a portion of the video displays, in a single shot video sequence, the person performing, during the sports training, a sports motion, the sports motion being selected from a group consisting of: striking a ball with a sports implement and simulating striking a ball with the sports implement, the video being captured from behind the person, and wherein during the sports motion the person adopts an impact position, the impact position being selected from a group consisting of: the position of the person during the sports motion when impacting the ball with the sports implement and the position during the sports motion corresponding to when the person would have hit a ball with the sports implement;
   calculating by a hardware processor, for each of a number $T_C$ of the image frames, one or more frame difference measures between a respective image frame and a selected other image frame, wherein each image frame comprises a number P of pixels or groups of pixels and wherein each of the one or more frame difference measures comprises a measure of a difference between each of a number $P_C$ of pixels or groups of pixels and each of the corresponding pixels or groups of pixels in the selected other image frame, wherein each of the one or more frame difference measures comprises a difference location indicator, the difference location indicator being a measure of the position of pixels or groups of pixels differing by at least a threshold amount between the respective image frame and the selected other image frame;
   analysing by a hardware processor one of the one or more frame difference measures for each of the image frames to determine a downswing phase of the sports motion;
   analysing the difference location indicators for each of the image frames to identify a peak in the difference location indicators in the determined downswing phase of the sports motion;
   identifying an impact image frame of the number T of the image frames that shows the person adopting the impact position, the impact image frame corresponding to the image frame at a time of the peak in the difference location indicators in the determined downswing phase of the sports motion;
   extracting impact image frame data representative of the impact image frame that shows the person adopting the impact position from the data representative of the number T of image frames constituting the video; and
   outputting on a display device the impact image frame showing the person in the impact position, the impact image frame being output on the display device separately from the video for providing feedback for correcting training errors of the person during the sports training.

2. The computer-implemented method as claimed in claim 1, further comprising: analysing the one or more frame difference measures to identify one or more other predetermined key positions of the person during the sports motion.

3. The computer-implemented method as claimed in claim 2, wherein the step of analysing the one or more frame difference measures to identify a plurality of image frames that each show the one or more other predetermined key positions of the person during the sports motion comprises:
   analysing by a hardware processor one of the one or more frame difference measures for each of the image frames to identify a plurality of patterns in temporal variations in the one or more frame difference measures;
   associating each pattern with a motion phase of the sports motion;
   analysing by a hardware processor one of the one or more frame difference measures for each of the image frames to identify a sub-pattern in the one or more frame difference measures within the pattern associated with the respective motion phases of the sports motion;
   identifying image frames of the number T of the image frames that shows the person adopting the one or more other predetermined key positions of the person during the sports motion, the identified image frames corresponding to the image frames associated with the identified sub-pattern in the one or more frame difference measures;

extracting image frame data representative of the one or more image frames that shows the person adopting the one or more other predetermined key positions of the person during the sports motion from the data representative of the number T of image frames constituting the video; and outputting on the display device the one or more image frames showing the person adopting the one or more other predetermined key positions of the person during the sports motion, the one or more image frames being output on the display device separately from the video, for providing feedback for correcting training errors of the person during the sports training.

4. The computer-implemented method as claimed in claim 3, wherein the method comprises extracting a portion of the video in between two image frames showing the person adopting the one or more other predetermined key positions of the person during the sports motion and outputting said portion of the video on a display device separately from the video, for providing feedback for correcting training errors of the person during the sports training.

5. The computer-implemented method as claimed in claim 3, wherein the step of identifying a plurality of patterns comprises identifying peaks and/or troughs in temporal variations in the frame difference measures.

6. The computer-implemented method as claimed in claim 2, wherein the method comprises identifying each of the image frames showing the person in one of the predetermined key positions of the person during the sports motion using one of a plurality of rules, each rule being predetermined for the respective predetermined key position of the person.

7. The computer-implemented method as claimed in claim 1, wherein the one or more frame difference measures comprise one or more of the following:
a measure of the amount of movement between image frames;
a measure of the position of movement between image frames; and
a measure of the velocity or a derivative thereof of movement between image frames.

8. The computer-implemented method as claimed in claim 1, wherein the sports motion is a golf swing.

9. The computer-implemented method as claimed in claim 1, wherein the one or more frame difference measures comprises two or more frame difference measures and the two or more frame difference measures comprises a difference ratio $DRatio(d_{thres})$, the difference ratio $DRatio(d_{thres})$ being the proportion of pixels or groups of pixels in the respective image frame differing by at least a predetermined threshold from each of the corresponding pixels or groups of pixels in the selected other image frame.

10. The computer-implemented method as claimed in claim 9, wherein the method comprises analysing the difference ratios $DRatio(d_{thres})$ to determine the downswing phase of the sports motion, the downswing phase of the sports motion being when the difference ratios $DRatio(d_{thres})$ are relatively high compared to the difference ratios $DRatio(d_{thres})$ during other phases of the sports motion.

11. The computer-implemented method as claimed in claim 1, wherein the one or more frame difference measures comprises at least one of the group selected from: a vertical difference location indicator being a measure of the vertical position of pixels or groups of pixels differing by at least a threshold amount between the respective image frame and the selected other image frame; and a horizontal difference location indicator being a measure of the horizontal position of pixels or groups of pixels differing by at least a threshold amount between the respective image frame and the selected other image frame.

12. The computer-implemented method as claimed in claim 11, wherein the method comprises analysing at least one of: the vertical difference location indicators; and a velocity of pixel movement between the respective image frame and the selected other image frame, to determine the downswing phase of the sports motion.

13. The computer-implemented method as claimed in claim 12, wherein the method comprises calculating, for each of the number $T_C$ of the image frames, a difference frame D between the respective image frame and a selected other image frame, wherein the difference frame D comprises one of the one or more frame difference measures between each of the number $P_C$ of pixels or groups of pixels and each of the corresponding pixels or groups of pixels in the selected other image frame.

14. The computer-implemented method as claimed in claim 13, wherein the vertical difference location indicator is the $p^{th}$ percentile of the vertical position of pixels or groups of pixels exceeding a predetermined threshold in the respective difference frame D.

15. The computer-implemented method as claimed in claim 1, wherein the method further comprises the step of identifying the portion of the video displaying the person while performing the sports motion.

16. The computer-implemented method as claimed in claim 1, wherein the method further comprises analysing the one or more frame difference measures and thereby identifying one or more motion phases other than the downswing phase of the sports motion.

17. The computer-implemented method as claimed in claim 1, wherein the method comprises analyzing, by a hardware processor, the impact image frame data representative of the impact image frame that shows the person adopting the impact position to automatically generate the feedback for correcting training errors of the person during the sports training and outputting the feedback on the display device.

18. The computer-implemented method as claimed in claim 17, wherein the step of analysing the impact image frame data representative of the impact image frame that shows the person adopting the impact position to generate the feedback for correcting training errors comprises:
executing a straight line detection algorithm to detect the sports implement in the impact image frame; and
outputting on the display device the impact image frame showing the person in the impact position while simultaneously displaying on the display device a straight line corresponding to the position of the sports implement in the impact image frame.

19. The computer-implemented method as claimed in claim 1, wherein the method comprises storing the impact image frame data representative of the impact image frame that shows the person adopting the impact position in a memory.

20. The computer-implemented method as claimed in claim 19, wherein the method comprises deleting data representative of the number T of image frames other than the stored impact image frame data representative of the impact image frame that shows the person adopting the impact position.

21. An apparatus for analysing a video for improving sports training of a person, the apparatus comprising:
a memory configured to store data representative of a number T of image frames constituting the video, wherein at least a portion of the video displays, in a single shot video sequence, the person performing, during the sports training, a sports motion, the sports motion being selected from a group consisting of: striking a ball with a sports implement and simulating striking a ball with the sports implement, the video being captured from behind the person, and wherein during the sports motion the person adopts an impact position, the impact position being selected from a group consisting of: the position of the person during the sports motion when impacting the ball with the sports implement and the position during the sports motion corresponding to when the person would have hit a ball with the sports implement;

a processor configured to calculate, for each of a number $T_C$ of the image frames, one or more frame difference measures between a respective image frame and a selected other image frame, wherein each image frame comprises a number P of pixels or groups of pixels and wherein each of the one or more frame difference measures comprises a measure of a difference between each of a number $P_C$ of pixels or groups of pixels and each of the corresponding pixels or groups of pixels in the selected other image frame, wherein each of the one or more frame difference measures comprises a difference location indicator, the difference location indicator being a measure of the position of pixels or groups of pixels differing by at least a threshold amount between the respective image frame and the selected other image frame, the processor being further configured to:

analyse one of the one or more frame difference measures to determine a downswing phase of the sports motion;

analyse the difference location indicators for each of the image frames to identify a peak in the difference location indicators in the determined downswing phase of the sports motion;

identify an impact image frame of the number T of the image frames that shows the person adopting the impact position, the impact image frame corresponding to the image frame at a time of the peak in the difference location indicators in the determined downswing phase of the sports motion;

extract impact image frame data representative of the impact image frame that shows the person adopting the impact position from the data representative of the number T of image frames constituting the video; and output on a display device the impact image frame showing the person in the impact position, the impact image frame being output on the display device separately from the video for providing feedback for correcting training errors of the person during the sports training.

22. The apparatus as claimed in claim 21, further comprising:

a video capture device for recording the video.

* * * * *